May 1, 1962 J. F. COULEUR 3,032,266

DECIMAL TO BINARY CONVERSION OF NUMBERS LESS THAN UNITY

Filed July 12, 1960 2 Sheets-Sheet 1

INVENTOR:
JOHN F. COULEUR,
BY Delbert P. Warner
HIS ATTORNEY.

DECIMAL TO BINARY CONVERSION OF NUMBERS LESS THAN UNITY

Filed July 12, 1960 2 Sheets-Sheet 2

FIG. 3.

| BINARY | BINARY CODED DECIMAL | | | | |
|---|---|---|---|---|---|
| | TENTHS 3 | HUNDREDTHS 2 | THOUSANDTHS 8 | | ROW NUMBER |
| | 0011 | 0010 | 1000 | | (1) |
| | 0011 | 0010 | 1011 | T | (2) |
| 0 | 0110 | 0101 | 0110 | S | (3) |
| 0 | 1001 | 1000 | 1001 | T | (4) |
| 01 | 0011 | 0001 | 0010 | S | (5) |
| 01 | 0011 | 0001 | 0010 | T | (6) |
| 010 | 0110 | 0010 | 0100 | S | (7) |
| 010 | 1001 | 0010 | 0100 | T | (8) |
| 0101 | 0010 | 0100 | 1000 | S | (9) |
| 0101 | 0010 | 0100 | 1011 | T | (10) |
| 01010 | 0100 | 1001 | 0110 | S | (11) |
| 01010 | 0100 | 1100 | 1001 | T | (12) |
| 010100 | 1001 | 1001 | 0010 | S | (13) |
| 010100 | 1100 | 1100 | 0010 | T | (14) |
| 0101001 | 1001 | 1000 | 0100 | S | (15) |
| 0101001 | 1100 | 1011 | 0100 | T | (16) |
| 01010011 | 1001 | 0110 | 1000 | S | (17) |
| 01010011 | 1100 | 1001 | 1011 | T | (18) |
| 010100111 | 1001 | 0011 | 0110 | S | (19) |
| 010100111 | 1100 | 0011 | 1001 | T | (20) |
| 0101001111 | 1000 | 0111 | 0010 | S | (21) |

T MEANS TEST AND ADD THREE TO ANY DECADE ≧ 5
S MEANS SHIFT

FIG. 4.

| BINARY | BINARY CODED DECIMAL | | | | | | |
|---|---|---|---|---|---|---|---|
| | $10^{-1}$ (3) | $10^{-2}$ (2) | $10^{-3}$ (8) | $10^{-4}$ (1) | $10^{-5}$ (2) | $10^{-6}$ (5) | |
| | 0011 | 0010 | 1000 | 0001 | 0010 | 0101 | |
| | 0011 | 0010 | 1011 | 0001 | 0010 | 1000 | T |
| 0 | 0110 | 0101 | 0110 | 0010 | 0101 | 0 | S |
| 0 | 1001 | 1000 | 1001 | 0010 | 1000 | | T |
| 01 | 0011 | 0001 | 0010 | 0101 | 0 | | S |
| 01 | 0011 | 0001 | 0010 | 1000 | | | T |
| 010 | 0110 | 0010 | 0101 | 0 | | | S |
| 010 | 1001 | 0010 | 1000 | | | | T |
| 0101 | 0010 | 0101 | 0 | | | | S |
| 0101 | 0010 | 1000 | | | | | T |
| 01010 | 0101 | 0 | | | | | S |
| 01010 | 1000 | | | | | | T |
| 010101 | 0 | | | | | | S |

S = SHIFT
T = TEST AND ADD THREE TO ANY DECADE ≧ 5

INVENTOR:
JOHN F. COULEUR,

BY Delbert P. Warner
HIS ATTORNEY.

United States Patent Office 3,032,266

Patented May 1, 1962

3,032,266

DECIMAL TO BINARY CONVERSION OF NUMBERS LESS THAN UNITY

John F. Couleur, Fayetteville, N.Y., assignor to General Electric Company, a corporation of New York Filed July 12, 1960, Ser. No. 42,337

7 Claims. (Cl. 235—155)

This invention relates to a method and apparatus for converting a representation of data in a first number system to an equivalent representation in a second number system. More particularly, this invention relates to a method and apparatus for converting a binary coded decimal number having a value less than unity, i.e., a binary coded decimal fraction, to a pure binary number.

The converse problem of converting a pure binary number having a value less than unity, i.e., a binary fraction, to a binary coded decimal number forms the subject matter of an application entitled, "Binary to Decimal Conversion of Numbers Less Than Unity," filed by John F. Couleur concurrently herewith and assigned to the same assignee as the present application. Parallel problems of converting whole numbers, or integers, from one radix to another have been treated in two co-pending applications filed together by John F. Couleur on October 7, 1957, and assigned to the same assignee as is the instant invention. These two applications are, respectively, Serial Number 688,509 entitled "Binary to Decimal Conversion" and Serial Number 688,589 entitled "Decimal to Binary Conversion."

It is well known in the digital computing arts that any given number can be expressed in many different number systems each using a different number base or radix. The number system in common everyday use is, of course, the decimal system in which a base or radix of ten is used. Each digit of a number is then understood to be a multiplier or coefficient of a power of ten, the power implied increasing from right to left in accordance with the positional significance of the digit. Thus, the decimal number 0.328125 may be explicitly written as $3\times10^{-1}+2\times10^{-2}+8\times10^{-3}+1\times10^{-4}+2\times10^{-5}+5\times10^{-6}$. Although many digital computers have been built which are designed to operate on an essentially decimal basis, many of the more modern digital computers are designed to operate on data expressed in pure binary notation rather than in decimal notation. In the binary system, of course, a number base of two is used in place of the number base or radix ten used in the decimal system. Thus, the decimal number 0.09 may be explicitly written in pure binary form as $$0\times2^{-1}+0\times2^{-2}+0\times2^{-3}+1\times2^{-4}+1\times2^{-5}+1\times2^{-6}+1\times2^{-7}+1\times2^{-8}$$

More briefly, this binary nine-hundredths is commonly written as 0.00011111 wherein the number base two is implied and only the coefficients are expressed. Furthermore, those computers which do operate on decimal data frequently use a number system known as binary coded decimal rather than pure decimal. Thus, the decimal number 0.328125 in binary coded decimal form can be explicitly expressed as $$(0\times2^3+0\times2^2+1\times2^1+1\times2^0)10^{-1}+(0\times2^3+0\times2^2+1\times2^1+0\times2^0)10^{-2}+(1\times2^3+0\times2^2+0\times2^1+0\times2^0)10^{-3}+(0\times2^3+0\times2^2+0\times2^1+1\times2^0)10^{-4}+(0\times2^3+0\times2^2+1\times2^1+0\times2^0)10^{-5}+(0\times2^3+1\times2^2+0\times2^1+1\times2^0)10^{-6}$$

More briefly, this number is commonly written as 0000.0011 0010 1000 0001 0010 0101. It will be noted that the implied radix for each group of four binary digits is still ten, but that each decimal digit is individually expressed in four place binary notation in order to render the data mor tractable to machine techniques. For a more complete discussion of arithmetic or number systems reference is made to a book entitled "High Speed Computing Devices" written by the Staff of Engineering Research Associates Incorporated and published by McGraw Hill, New York, 1950, or to a book entitled "Arithmetic Operations in Digital Computers" written by R. K. Richards and published by D. Van Nostrand Company, New York, 1955.

It has long been known that the arithmetic process of converting a pure decimal fraction to a pure binary fraction consists of repeated multiplication of the decimal number by 2, the binary number base, and noting the carry after each multiplication. See, for example, page 287 of the second above noted book. A similar arithmetic process is applicable to the conversion of binary coded decimal fractions to pure binary fractions. The instrumentation of this process, however, using standard multiplication techniques has in the past required cumbersome and expensive equipment and has been excessively time consuming. The problems of entering fractional binary coded decimal keyboard data to a pure binary computer system or of utilizing fractional binary coded decimal output data from a decimal computer system in a pure binary computer system, for example, have in the past been solved by using either a miniature computer or a time consuming counting process in order to perform the necessary conversion from one number system to the other.

It is therefore an object of this invention to provide a method and apparatus for rapidly and economically converting a representation of data in a first number system to an equivalent representation of data in a second number system.

It is a more specific object of this invention to provide a method and apparatus for converting a binary coded decimal number having a value less than unity to a pure binary number.

It is a still further object of this invention to provide a new and improved method and apparatus for processing data.

Briefly, in accordance with one aspect of this invention, a decimal fraction or a decimal number less than unity having N digits is represented in binary coded decimal form and read into a shift register such as is shown on pages 144–148 of the reference "Arithmetic Operations in Digital Computers" where the registers have 4N stages grouped to form N decades with the content of each decade representing one digit of said decimal number. The conversion process consists of shifting this binary coded decimal fraction out of the register one digit at a time, most significant digit first, testing the magnitude of the content of each decade following each shift after the first shift, adding binary three to any decade, the binary content of which is equal to or greater than five when tested, and terminating the steps with a last shift. The output of the register can then be shown to be a pure binary representation of the binary coded decimal fraction originally read into the register.

While the novel and distinctive features of the invention are particularly pointed out in the appended claims, a more expository treatment of the invention, in principle and in detail, together with additional objects and advantages thereof, is afforded by the following description and accompanying drawings in which:

FIG. 3 is a chart illustrating the operation of the apparatus of FIGS. 1 and 2; and FIG. 4 is a chart illustrating the operation, in a special case, of apparatus similar to that in FIGS. 1 and 2.

Turning now to the drawings, and in particular to FIG.

Figure 1:
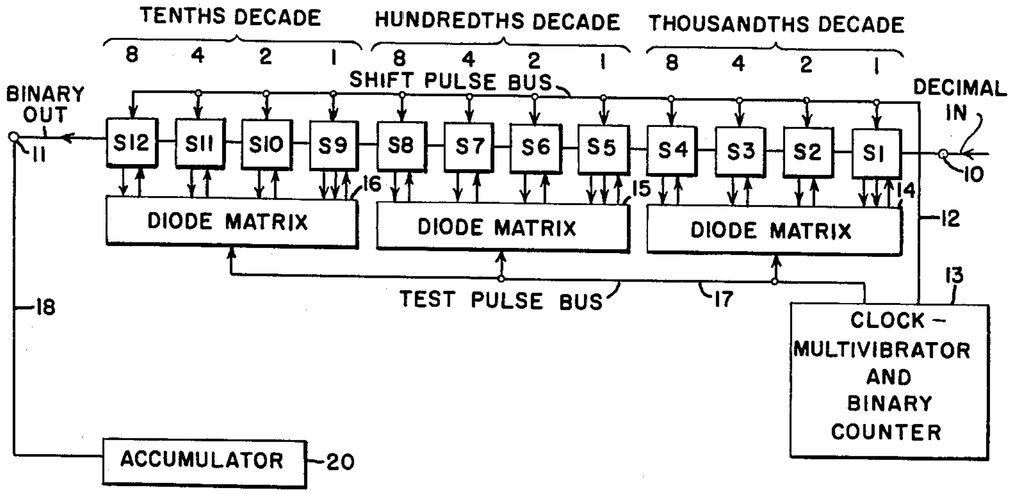
FIG. 1 is a block diagram of the conversion apparatus.

1 thereof, there is shown a shift register which, by way of example only, is illustrated as consisting of twelve stages, S1 through S12. Of course, it will be understood that a shift register of any desired number of stages could be used, there being in general 4N stages for an N decimal fraction. Thus, the four stages, S1, S2, S3, and S4, which are associated with the diode matrix 14 are indicated in FIG. 1 as comprising the thousandths decade of the shift register; the four stages, S5, S6, S7, and S8, which are associated with diode matrix 15 are indicated as comprising the hundredths decade of the shift register; and the four stages, S9, S10, S11, and S12, which are associated with diode matrix 16 are indicated as comprising the tenths decade of the shift register. There are thus N decades and 4N stages for an N digit decimal fractional number.

Each stage of a decade may contain or represent either a binary one or a binary zero by being in one of two stable states (see page 47 of the aforementioned Richards publication). However, when the number is in binary coded decimal form, the stages of each decade are assigned respective weights 8, 4, 2, and 1 decreasing in significance in the same direction as do the decades throughout the register as shown in FIG. 1. These weights, of course, are simply the implied powers of the number base two which, as explained above, are implicit in the binary coded decimal form, that is, $1=2^0$, $2=2^1$, $4=2^2$, and $8=2^3$. Similarly, each decade has impliedly associated therewith a power of 10 which increases from right to left. The weights 8, 4, 2, and 1 will hereinafter be used generically to refer to the corresponding stage of any one of the decades. Thus a "4" stage will be used to mean any or all of the stages S3, S7, and S11.

Any conventional type of shift register (see pages 144–148 of the aforementioned Richards publication) may be used. As is well known in the art, each stage of such a register consists of a bistable device which may, for example, comprise a vacuum tube "flip-flop," a similar transistor circuit, or a bistable magnetic circuit. As is common practice, one of the two states of each bistable device is taken to represent a binary zero, whereas the other state of the device is taken to represent a binary one. The stages of the register are connected in cascade or serial relation between an input terminal 10 and an output terminal 11. Each of the stages of the register is connected by a shift pulse bus 12 to a source 13 of clock pulses, such as is shown on pages 49, 322, 337 and 338 of the Richards publication. As is also well known in the art, the circuitry of each stage is such that upon application of a shift pulse to the bus 12, each of the stages assumes the state of the preceding stage. That is to say, S12 assumes the state which S11 had, S11 assumes the state which S10 had, etc. Of course, the prior state of stage S12 is indicated, in response to a shift pulse, at terminal 11. That is to say, in accordance with the usual convention, if stages S12 contained a binary one a pulse will appear at terminal 11, whereas if stage S12 contained a binary zero no pulse will appear at terminal 11 in response to the application of a shift pulse. It will thus be noted that the register is connected to shift its content from right to left as shown in FIG. 1.

Each decade of the register has associated therewith a logic circuit such as one of the diode matrices 14, 15, and 16 shown connected respectively to the thousandths decade, the hundredths decade, and the tenths decade. Each of the diode matrices 14, 15, and 16 may, for example, consist of a logic circuit of the type shown by way of example in the block diagram of FIG. 2. For further details, reference can be made to chapters 2, 3 and 4 of the aforementioned Richards publication. A test pulse bus 17 connects each of the diode matrices to the clock 13. The clock 13 may, for example, include a free-running multivibrator which puts out pulses alternately first on the shift pulse bus 12 and then on the test pulse bus 17. For any given number of binary digits expected from the conversion there will be a corresponding known number of required shifts (and tests) of the shift register comprising S1 through S12 under control of the pulses of leads 12 and 17 from clock 13. In other words, the number of shift (and test) pulses required will be determined by the numbers of binary digits expected from the conversion, e.g., a 3 decimal digit number is expressed by a 10 binary digit number and 10 test and 10 shift pulses are required, a 6 decimal digit number is expressed by 20 binary digits requiring 20 shift and 20 test pulses, etc. For the circuit in FIG. 1, there will be ten tests and ten shifts in the twelve stage embodiment for the conversion described and illustrated in FIG. 3. When the converversion commences, the free-running multivibrator of the clock is actuated. A counter chain or circuit, also a part of the clock, counts the output pulses of the multivibrator. The clock also includes a counter circuit which is connected to shut off the multivibrator after the desired number of pulses have been emitted as will be explained in greater detail below. Such a combination of a counter chain and multivibrator is mentioned on pages 337–341 and 322 of the Richards publication cited heretofore.

Output terminal 11 is shown connected by a connector 18 to an accumulator 20. In this manner of connection a binary coded decimal number which has been read into the shift register via input terminal 10 is read out of the shift register in pure binary form and stored in accumulator 20, which may be another shift register, or applied to any desired circuitry. The means for reading-in the binary coded number may include a shift register, or each stage S1–S12 may be individually set to represent the proper number.

In operation, the conversion process is accomplished in the diode matrices associated with the register. Each of these matrices contains logic circuitry for sensing the state of the associated decade of the register and for providing appropriate changes in said decade in the event that the decade registers five or more. These "appropriate changes" involve adding binary three to the associated decade to prepare it so that the next shift to the left and into a higher decade will actually double the number. In this connection, it will be realized that a shift to the left within each decade will produce a doubling in value, but that a shift from the eight stage of one decade to the one stage of the next higher decade will not double the value. This latter condition exists due to the fact that a shift from the eight stage of the lower decade to the one stage of the higher decade is only an increase from eight to ten and not a doubling. Adding three to the lower stage, before shifting, when the lower stage contains five to nine increases the lower stage from eight to twelve and a shift toward the next higher stage will then effect a doubling of the original value whether it be five, six, seven, eight or nine.

Figure 2:
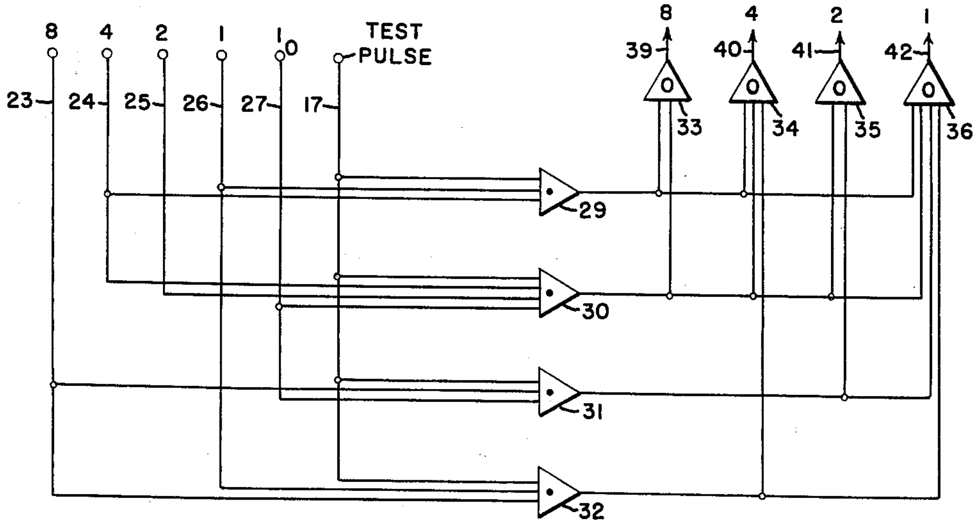
FIG. 2 is a block diagram of the logic circuitry embodied in each of the diode matrices shown in FIG. 1.

The diode matrix shown in FIG. 2 is based on the following logic. If, after the first shift, a five or greater appears in the matrix, three must be added to the resulting number in order to effect a doubling of the number with a shift to the next higher decade. The five possible numbers which must be modified and the sum after adding three are set out in the following table:

| Number | Sum=Number+3 |
|---|---|
| 8 4 2 1 | 8 2 4 1 |
| 0 1 0 1=5 | 1 0 0 0=8 |
| 0 1 1 0=6 | 1 0 0 1=9 |
| 0 1 1 1=7 | 1 0 1 0=10 |
| 1 0 0 0=8 | 1 0 1 1=11 |
| 1 0 0 1=9 | 1 1 0 0=12 |

It is convenient in a shift register to accomplish this addition by flipping, or complementing, digits, that is to say, by changing a zero to one, or a one to zero by changing the electrical state of the bistable device in the affected stage. From the above chart it will be seen that the requirements for adding three when the number in a decade is equal to or greater than 5 may be expressed in the logic statements set out below, in which numerals are used to designate the stages of a decade and the binary content of the stage is written out as "one" or "zero":

If 4 is one and 1 is one, then 8, 4 and 1 must flip;
If 4 and 2 are one and 1 is zero, then 8, 4, 2 and 1 must flip;
If 8 is one and 1 is zero, then 2 and 1 must flip;
If 8 is one and 1 is one, then 4 and 1 must flip.

The matrix of FIG. 2 is designed to sense which, if any, of these requirements are met and to put out the pulses to flip the required stages, in accordance with the above logic statements. In FIG. 2, the lines 23, 24, and 25 are connected as inputs from the stages having weights of 8, 4, and 2, respectively, whereas the lines 26 and 27 are connected to the stage having unit weight. The lines 23, 24, 25, and 26 will be activated if their respective stages contain a binary one, whereas line 27 will be activated if its respective stage contains a binary zero. The binary zero is indicated in FIG. 2 by the zero subscript on the designation of 1 associated with line 27. Line 23 is connected to each of the logical "and" circuits 31 and 32. Each of these "and" circuits is such that it will emit or transmit a pulse only in response to the simultaneous application of a pulse to all of its input terminals. Many such circuits are known in the art and each of the circuits 29 through 32 may be of any conventional type such as, for example, an appropriately connected diode stage. Line 24 is connected to the "and" circuits 29 and 30, line 25 connects only to the circuit 30, line 26 connects to the circuits 29 and 32, and line 27 connects to circuits 30 and 31, whereas the test pulse line 17 is connected to each of the "and" circuits 29, 30, 31 and 32. Lines 39, 40, 41 and 42 couple the outputs of respective "or" circuits 33, 34, 35 and 36 to respective ones of the 8—4—2—1 stages of the decades as shown in FIG. 1.

The output from "and" circuit 30 is connected to each of a group of "or" circuits 33, 34, 35, and 36. The output from "and" circuit 29 is connected to "or" circuits 33, 34, tnd 36, the output from "and" circuit 31 is connected to "or" circuits 35 and 36, while the output from "and" circuit 32 is connected to "or" circuits 34 and 36. Each of the "or" circuits 33, 34, 35, and 36 may be of any conventional type and has the property that it will provide an output pulse in response to a signal or pulse applied at any one of its input terminals. The outputs from these "or" circuits are connected back to the respective stages of the associated decade as indicated by the arrow designations in FIG. 1 and are used as flipping pulses which provide changes in accordance with the chart and logical statements or equations given above.

Turning to FIG. 3, there is shown a chart illustrating the operation of the system of FIGS. 1 and 2 in converting the decimal number 0.328 to binary form. It will be noted that the 12 columns of the chart under the bracket labeled "Binary Coded Decimal" represent the 12 stages of a shift register, the entry in each position being the content of the particular stage at a given time. The 20 rows of the chart represent the 20 different steps involved in the conversion process for this number to the desired accuracy. Thus, it will be noted that prior to the first conversion step the number 0.328 is read into the register in binary coded decimal form. Next, the clock 13 puts out a test pulse over the line 17. This pulse is applied to each of the diode matrices as the actuating input to their "and" circuits to determine if any of the decades contain a number equal to or greater than 5. It will be noted that in the first row of the chart, the thousandths decade contains a binary representation of 8. As explained above, diode matrix 14 is such that it senses the presence of 8 and puts out the necessary pulses to add three to this number and produce the representation shown in the second row of the chart.

Next, the clock 13 puts out a shift pulse along line 12 and the entire content of the register is shifted one place to the left to produce the configuration shown in the third row of the chart. It will be noted that the zero from the highest stage has been shifted out and is in the position of the most significant (and only) digit of the binary number. Next, a test pulse from clock 13 is applied to line 17. In the configuration shown in the third row of the chart three of the decades (tenths, hundredths and thousandths) contain a number equal to or greater than 5. Hence, the next indicated step is to add three to the contents of these three decades to provide the values indicated in the fourth row. Each of the shift and test pulses may, for example, consist of uniformly spaced half-microsecond pulses. The complementing or flipping, of course, occurs during the test pulse when the conditions of any one of the above logic equations are satisfied.

The sequence described above is repeated as indicated by the chart of FIG. 3 until either the entire number has been shifted out of the register or the desired number of decimal points has been determined in the register. Since the remaining steps are repetitive, it is not deemed necessary to describe them in detail. It is believed that the chart of FIG. 3 is self-explanatory in view of the above discussion. It should be noted, however, that in general the apparatus of the present invention requires a sufficient number each of test and of shift steps to convert a decimal fraction to a corresponding binary fraction. In the example shown, ten test pulses and ten shift pulses are required to determine a binary fraction to a sufficient number of decimal places (10) to correspond to a 3-place decimal fraction.

It will be of interest to note that, even a binary coded decimal fraction which has an exact equivalent in the binary form, only a few pulses are necessary to clear the binary coded decimal from the register. Such a number is 0.328125, which calculations $(1\times2^{-2}+1\times2^{-4}+1\times2^{-6})$ indicate is exactly equivalent to binary 0.010101. A table indicating the steps necessary to convert the binary coded decimal 0.328125 to the corresponding binary number is indicated in FIG. 4. It will be understood that a register capable of making this conversion would have twice the capacity of that shown in FIG. 1, but would be like that in FIG. 1 in all other important respects.

It should be noted that this conversion operation could be performed faster by the use of a more complex matrix which would permit the test and shift steps to be conducted simultaneously. It will also be apparent to those skilled in the art that other logic equations could be used to satisfy the conditions listed in the chart above and that specifically different matrix circuits would result which would, nonetheless, give the same result. Furthermore, it should be noted that a similar type of conversion process is applicable as between number systems other than the binary coded decimal and pure binary forms. For example, a tertiary coded duodecimal fraction could, by similar techniques, be converted to a pure tertiary fraction.

It is believed that these alternatives will be made more readily apparent by considering the foregoing specific exemplary embodiment of the invention from the following point of view. In the classical process of multiplying a decimal number of several digits by 2, each of the digits is multiplied by 2 and any carry occasioned by one of the digits being five or more is accommodated by adding one to the next higher digit. In the present method and apparatus for conversion of binary coded decimal fractions to binary numbers, each shift must also perform a binary multiplication by 2. Provision of the carry from one decade to another is assured before the shift (multiplication by two) by testing each decade for the presence of five or more, since this is an indication that the next higher decade should receive a carry. If five or more is present in a decade, three is added to enable the next shift to provide the proper doubling and a carry into the next higher decade. To illustrate, if five were shifted in a decade, that decade would then contain ten and there would be no carry to the next decade, but if three is added first, there will be a carry into the next decade to indicate ten and the lower decade will register zero. It will be obvious that apparatus, other than diode matrices, could be used to perform the necessary arithmetic to provide a remainder in accordance with the present invention. The matrices illustrated are, however, a preferred embodiment of the invention since shift register stages lend themselves well to the process.

It should be noted further that, as pointed out above, the words "shift register" have been used to mean any apparatus for storing and progressively transferring data in order to facilitate its sequential examination. The logic circuits are illustrated as having an operating position which is fixed relative to the moving data. It will be apparent, however, that the same relationship could be achieved and the same process carried out by considering the data to be held in a fixed position and the logical operations to be performed sequentially upon the data. Such a transfer of logic operations could be carried out, for example, by means of stepping switches scanning information stored in relays or any other bistable device. A stepping switch can scan by moving wipers, one wiper per bit, with each wiper traveling one bit behind the other to successfully move the logic past the statically stored information. The conversion could be directed by a second set of stepping wipers moving with the first set. Of course, any such apparatus is essentially nothing more than an equivalent of the shift register and matrices described above.

While the principles of the invention have now been made clear, there will be immediately obvious to those skilled in the art many modifications in structure, arrangement, proportions, the elements and components used in the practice of the invention, and otherwise, which are particularly adapted for specific environments and operating requirements without departing from those principles.

What I claim and desire to secure by Letters Patent of the United States is:

1. Apparatus for converting a binary coded decimal representation of an N decimal digit number representing a number smaller than unity to an equivalent binary representation thereof comprising, a shift register having 4N cascaded binary stages grouped to form N decades of consecutively decreasing decimal significance, the four cascaded binary stages of each of said decades having decimal weights of 8, 4, 2, and 1 arranged respectively in decreasing order of weight in the same direction as each of said decades decreases in significance throughout said register, the sum of the weighted binary content of the four stages of each decade representing one digit of said N digit decimal number; first means to shift the entire content of said register one stage at a time in said direction of increasing significance, second means to add binary three to the content of any decade containing a number equal to or greater than five, and third means connected to control the operation of said first and second means.

2. Apparatus for converting a binary coded decimal representation of an N decimal digit number equal to a fraction to an equivalent binary representation thereof comprising, a shift register having N decades of consecutively decreasing decimal significance, four binary stages in each of said decades having decimal weights of 8, 4, 2, and 1 arranged respectively in decreasing order of weight in the same direction as each of said decades decreases in significance throughout said register, the sum of the weighted binary content of the four stages of each decade representing one digit of said N digit decimal number; first means to determine the presence of a number equal to or greater than five in any decade, second means to add binary three to the content of any decade containing a number equal to or greater than five, third means to shift the entire content of said register one stage at a time in said direction of increasing significance, and fourth means connected to control the operation of said first, second and third means.

3. Apparatus as in claim 1 wherein said second means comprises a plurality of diode matrices, one of said matrices being connected to each of said decades.

4. Apparatus as in claim 2 wherein said first means comprises a plurality of diode matrices, one of said matrices being connected to each of said decades.

5. Apparatus for converting a binary coded decimal number of N decimal digits representnig a fraction to an equivalent binary number comprising, a shift register having 4N cascaded stages grouped to form N decades of consecutively decreasing decimal significance, each of said decades consisting of four consecutively adjacent stages of said register, the four binary stages of each of said decades having decimal weights of 8, 4, 2, and 1 arranged respectively in decreasing order of weight in the same direction as said decades decrease in significance throughout said register, the sum of the weighted binary content of the four stages of each decade representing one digit of said N digit decimal number; a source of clock pulses connected to shift the entire binary content of said register one stage at a time in the direction of increasing significance; circuit means associated with each of said decades and connected to add binary three to the content of any decade the binary content of which is equal to or greater than five after any shift; the operation of said circuit means being synchronized with that of said shift register by pulses from said source of clock pulses; said source of clock pulses being controlled by a counter to cause said shift register to perform a predetermined number of shifting operations.

6. Apparatus for converting a binary coded decimal representation of an N decimal digit number representing a fraction to an equivalent binary representation thereof comprising, a shift register, the respective binary states of the individual stages of said shift register affording a representation of said binary coded decimal number, said shift register having 4N cascaded stages grouped to form N decades of consecutively decreasing decimal significance, the four binary stages of each of said decades having decimal weights of 8, 4, 2, and 1 arranged respectively in decreasing order of weight in the same direction as said decades decrease in significance throughout said register, the sum of the weighted binary content of the four stages of each decade representing one digit of said N digit decimal number; individual logic circuit means associated with each of said decades, each of said logic circuit means being connected to add binary three to the contents of any decade containing a number equal to or greater than five in response to the application of a test pulse to said logic circuit; clock means connected to apply pulses in a recurring sequence in which every other one of said pulses is applied as a shift pulse to shift the entire content of said register by one stage in said direction of increasing significance and the remaining alternate ones of said pulses are applied as test pulses to all of said logic circuits; said clock means including a counter connected to control the total number of pulses emitted by said clock means.

7. An arrangement for converting a binary coded decimal number of N decimal digits representing a fraction to an equivalent binary number which comprises a shift register having 4N cascaded stages grouped to form N decades of consecutively decreasing decimal significance, said decades each comprising a set of four binary stages having decimal weights of 8, 4, 2, and 1 arranged respectively in decreasing order of weight in the same direction as said decades decrease in significance, said four binary stages of each decade totaling one digit of said N digit decimal number, means for determining the presence of a number equal to or greater than five in any decade, means for adding binary three to the content of any decade the binary content of which is equal to or greater than five, means for shifting the entire binary content of said register one stage in said direction of increasing significance, means for repeating said steps of determining the presence of five or greater of adding three and of shifting in alternate sequence until a binary signal of the desired accuracy has been shifted out, the first digit of said binary signal so shifted out being the most significant digit of said binary number and each succeeding binary digit so shifted out being the next least significant digit of said binary number.

No references cited.